US010931177B2

(12) United States Patent
Wang et al.

(10) Patent No.: US 10,931,177 B2
(45) Date of Patent: Feb. 23, 2021

(54) GENERATOR WITH BUILT-IN VOLTAGE CONTROLLER INSIDE A MOTOR HAVING A CHANGEOVER KNIFE SWITCH CONFIGURATION AND LOOPS

(71) Applicants: Yao-Lin Wang, Taichung (TW); Chong-Ying Wang, Taichung (TW)

(72) Inventors: Yao-Lin Wang, Taichung (TW); Chong-Ying Wang, Taichung (TW)

(*) Notice: Subject to any disclaimer, the term of this patent is extended or adjusted under 35 U.S.C. 154(b) by 491 days.

(21) Appl. No.: 15/951,636

(22) Filed: Apr. 12, 2018

(65) Prior Publication Data
US 2019/0319518 A1 Oct. 17, 2019

(51) Int. Cl.
| | | |
|---|---|---|
| *H02K 11/33* | (2016.01) | |
| *H02K 11/20* | (2016.01) | |
| *H02P 9/02* | (2006.01) | |
| *H02K 5/00* | (2006.01) | |

(52) U.S. Cl.
CPC .............. *H02K 11/33* (2016.01); *H02K 11/20* (2016.01); *H02P 9/02* (2013.01); *H02K 5/00* (2013.01)

(58) Field of Classification Search
CPC .. H02K 11/044; H02K 11/046; H02K 11/042; H02K 11/33; H02K 11/20; H02K 11/28; H02K 11/30; H02K 11/35; H02K 11/38; H02K 11/048; H02K 11/049; H02K 11/121; H02K 9/00; H02K 9/02; H02K 9/006; H02K 9/007; H02K 9/04; H02K 9/06; H02K 9/08; H02K 9/10; H02K 5/00; H02P 11/00; H02P 11/04; H02P 11/06

USPC ............ 318/34, 75, 400.21, 400.26–400.28, 318/785–793, 543–557
See application file for complete search history.

(56) References Cited

U.S. PATENT DOCUMENTS

| | | | | |
|---|---|---|---|---|
| 1,358,735 | A | * | 11/1920 | Hellmund ............... B60L 15/06 318/100 |
| 1,376,015 | A | * | 4/1921 | Hamilton ................. B60L 7/12 318/262 |
| 1,391,295 | A | * | 9/1921 | Barnum .................... H02P 1/26 318/780 |
| 1,406,389 | A | * | 2/1922 | James ..................... H01H 3/26 318/90 |
| 1,417,750 | A | * | 5/1922 | Lammers, Jr. ............ H02P 1/20 318/90 |
| 1,425,657 | A | * | 8/1922 | James ..................... B66B 1/06 318/269 |

(Continued)

*Primary Examiner* — Maged M Almawri
(74) *Attorney, Agent, or Firm* — Egbert Law Offices, PLLC

(57) ABSTRACT

A generator includes: a built-in voltage controller disposed inside the housing of the motor and connected to the stator; a loop changeover switch, wherein one side of the three groups of loop polar phase contact points is connected to the current output unit through three phase lines, and the other side is connected to the current output unit through three loop lines; a three-phase short-circuit changeover switch is in a spaced arrangement with the loop changeover switch and includes three groups of short-circuit polar phase contact points, one side of which is connected to each other through short-circuit wire, and the other side is connected to each phase line; three converted-voltage output lines, wherein one end electrically connected to the loop polar phase contact points of the loop changeover switch is connected to one side of the loop lines; the other end is used to connect to a power device.

4 Claims, 4 Drawing Sheets

(56) References Cited

U.S. PATENT DOCUMENTS

| | | | | |
|---|---|---|---|---|
| 1,431,249 A * | 10/1922 | Oberschmidt | H02P 1/20 | 318/63 |
| 1,725,772 A * | 8/1929 | Waite | B66B 1/36 | 187/284 |
| 1,764,877 A * | 6/1930 | Lewis | B66B 1/08 | 318/741 |
| 1,984,187 A * | 12/1934 | Hayward | H02J 3/46 | 290/4 A |
| 2,133,365 A * | 10/1938 | Trofimov | H02P 5/753 | 318/8 |
| 2,325,413 A * | 7/1943 | McArthur | B66C 13/26 | 318/742 |
| 2,325,454 A * | 7/1943 | Wilcox | B66C 13/26 | 318/742 |
| 2,347,917 A * | 5/1944 | Daniel | B66B 1/3476 | 318/474 |
| 4,142,137 A * | 2/1979 | Umpleby | E05F 15/77 | 318/283 |
| 4,142,139 A * | 2/1979 | Slaats | G05B 19/25 | 318/12 |
| 6,042,349 A * | 3/2000 | Ito | H02K 3/28 | 417/423.7 |
| 7,042,122 B1 * | 5/2006 | Dufala | H02K 3/47 | 310/179 |
| 7,492,120 B2 * | 2/2009 | Benn | F24S 20/50 | 320/101 |
| 2004/0100102 A1 * | 5/2004 | Wobben | F03D 7/0272 | 290/55 |
| 2009/0010782 A1 * | 1/2009 | Bartsch | H02K 11/33 | 417/423.2 |
| 2010/0013227 A1 * | 1/2010 | Weitkamp | F03D 80/50 | 290/44 |
| 2010/0109323 A1 * | 5/2010 | Russberg | H01L 37/04 | 290/7 |
| 2011/0254492 A1 * | 10/2011 | Armstrong | B60L 50/13 | 318/434 |
| 2012/0043760 A1 * | 2/2012 | Hagedorn | F03D 7/0224 | 290/44 |
| 2012/0068656 A1 * | 3/2012 | Fulton | H02K 11/33 | 318/497 |
| 2012/0261927 A1 * | 10/2012 | Gilpatrick | H01F 38/14 | 290/40 B |
| 2013/0175853 A1 * | 7/2013 | Chamberlin | B60L 50/16 | 307/9.1 |
| 2014/0008971 A1 * | 1/2014 | Hoffmann | H02P 25/22 | 307/9.1 |
| 2014/0062097 A1 * | 3/2014 | Brown | F01K 23/065 | 290/40 R |
| 2014/0175796 A1 * | 6/2014 | Rasmussen | H02J 3/381 | 290/44 |
| 2014/0277791 A1 * | 9/2014 | Lenard | H02J 7/34 | 700/287 |
| 2014/0300987 A1 * | 10/2014 | Otaguro | H02P 6/24 | 360/71 |
| 2014/0312620 A1 * | 10/2014 | Korber | F03D 7/0284 | 290/44 |
| 2015/0042254 A1 * | 2/2015 | Kato | B23D 51/16 | 318/458 |
| 2015/0291045 A1 * | 10/2015 | Sugawara | H01M 2/1077 | 318/139 |
| 2016/0146191 A1 * | 5/2016 | Berroteran Gil | H02P 13/06 | 290/44 |
| 2016/0173008 A1 * | 6/2016 | Waltuch | H02P 6/20 | 318/484 |
| 2016/0181909 A1 * | 6/2016 | Steimer | H02J 11/00 | 290/7 |
| 2018/0302011 A1 * | 10/2018 | Ganireddy | H02H 7/262 | |
| 2018/0331643 A1 * | 11/2018 | Ganireddy | F03D 9/25 | |
| 2019/0149079 A1 * | 5/2019 | Roesner | H02P 27/12 | 318/400.02 |
| 2020/0008314 A1 * | 1/2020 | Kuroiwa | H05K 5/006 | |
| 2020/0076337 A1 * | 3/2020 | Abbott | H02K 11/0094 | |

* cited by examiner

GENERATOR WITH BUILT-IN VOLTAGE CONTROLLER INSIDE A MOTOR HAVING A CHANGEOVER KNIFE SWITCH CONFIGURATION AND LOOPS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a generator, and more particularly to an innovative generator structure with a built-in voltage controller.

2. Description of Related Art Including Information Disclosed Under 37 CFR 1.97 and 37 CFR 1.98

A generator is a device that converts kinetic energy and/or other forms of energy into electrical energy. The large-scale generators currently in widespread use are alternators, which convert mechanical energy into electrical energy in the form of alternating current.

Alternating current generated by the operation of the alternator is usually configured through a commercially available transformer externally connected to the generator motor to increase or decrease its output voltage, so as to achieve the purpose of changing the output voltage. However, as far as practical experience in related industries is concerned, it was found that because the actual setting cost of the transformer is rather expensive, and as the power generation scale of the generator is larger, the coil winding cost required by the transformer device is relatively doubled, resulting in a problem and disadvantage of substantial increase in the price of generator products, which is indeed an important technical issue for the relevant industries to consider again.

BRIEF SUMMARY OF THE INVENTION

The main purpose of the present invention is to provide a generator with a built-in voltage controller. The technical problem trying to solve is to break through a goal of how to develop a new type of generator structure that is more ideal and practical. Said generator comprises a motor, which includes a housing, a stator and a rotor accommodated in the housing, and the stator has a current output unit.

The technical feature of the present invention to solve the problem is mainly that the generator comprises a built-in voltage controller, which is disposed inside the motor housing and is in electrical connection with the stator. The built-in voltage controller has a voltage up-down adjustment control function and includes a current output unit; a first loop changeover switch, which is a three-pole knife switch type and includes three groups of first loop polar phase contact points; one side of which is corresponding to the current output unit of the built-in voltage controller through the three phase lines for electrical connection; the other side of the three groups of first loop polar phase contact points is electrically connected to the current output unit of the built-in voltage controller through the three extended first loop lines; a second loop changeover switch, which is a three-pole knife switch type and is in a spaced arrangement relationship with the first loop changeover switch; the second loop changeover switch includes three groups of second loop polar phase contact points; one side of the three groups of second loop polar phase contact points is electrically connected with the three phase lines; the other side is corresponding to the three loop lines through the three extended second loop lines for electrical connection; a three-phase short-circuit changeover switch, which is a three-pole knife switch type and is in a spaced arrangement relationship with the second loop changeover switch; the three-phase short-circuit changeover switch includes three groups of short-circuit polar phase contact points; one side of the three groups of short-circuit polar phase contact points is electrically connected to each other through a short-circuit wire; the other side is correspondingly to the ends of the three phase lines for electrical connection; three converted-voltage output lines, with one end electrically connected to the second loop polar phase contact points of the second loop changeover switch, is connected to one side of the second loop lines; the other end of the three converted-voltage output lines is used to connect to a power device.

The other preferred embodiment of the present invention includes a single built-in voltage controller disposed within the motor housing and in electrical connection with the stator. The built-in voltage controller has a voltage up-down adjustment control function and includes a current output unit; a loop changeover switch, which is a three-pole knife switch type and includes three groups of loop polar phase contact points; one side of which is electrically connected to the current output unit of the built-in voltage controller through the three phase lines, and the other side of the three groups of loop polar phase contact points is electrically connected to the current output unit of the built-in voltage controller through the three extended loop lines; a three-phase short-circuit changeover switch is a three-pole knife switch type and is in a spaced arrangement relationship with the loop changeover switch; the three-phase short-circuit changeover switch includes three groups of short-circuit polar phase contact points; one side of which is electrically connected to each other through the short-circuit wire, and the other side is corresponding to and electrically connected to three phase lines; three converted-voltage output lines, with one end electrically connected to the loop polar phase contact points of the loop changeover switch, is connected to one side of the loop lines; the other end of the three converted-voltage output lines is used to connect to a power device.

DETAILED DESCRIPTION OF THE INVENTION

Referring to FIGS. 1 to 4, which are preferred embodiment of the generator with a built-in voltage controller in the present invention. However, these embodiments are for illustrative purposes only and not restricted by this structure in patent application.

Figure 4:
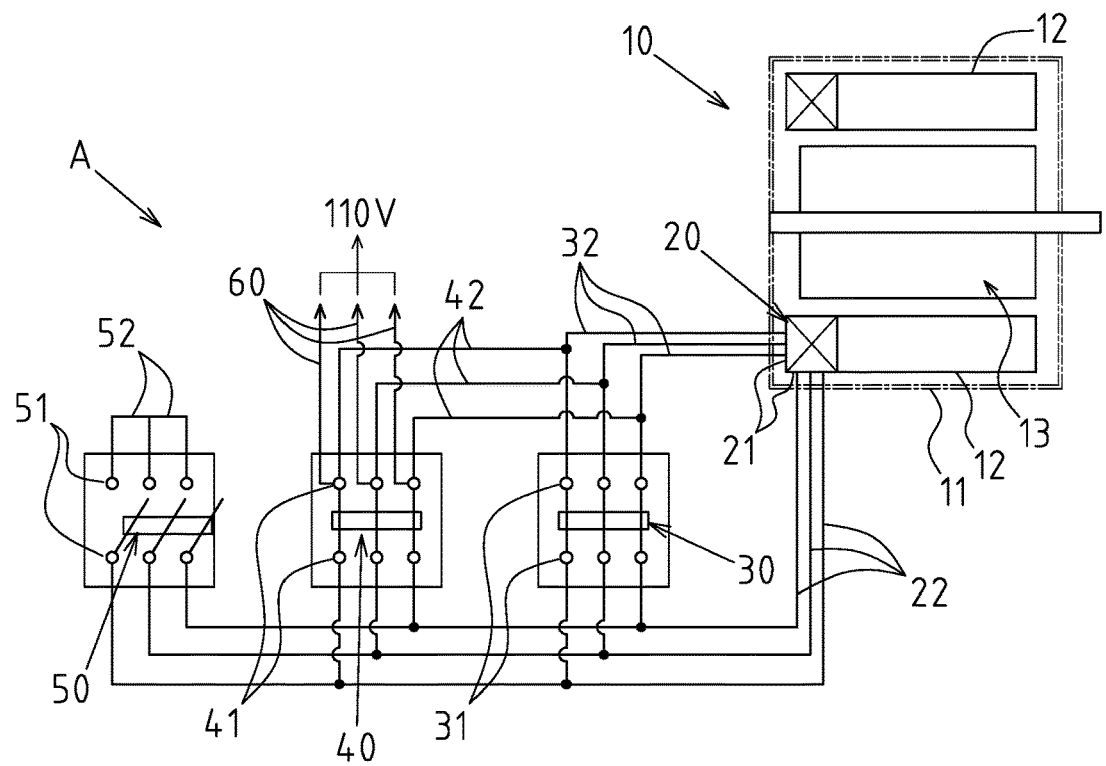
FIG. 4 is a schematic diagram of the first voltage output state of the voltage conversion structure of the present invention.

Said generator A comprises a motor 10, which includes a housing 11, a stator 12 and a rotor 13 accommodated in the housing 11. The generator A further includes the following constituents: a built-in voltage controller 20 disposed inside the housing 11 of the motor 10 and electrically connected with the stator 12 (as shown in FIG. 4); the built-in voltage controller 20 has a voltage up-down adjustment control function and includes a current output unit 21; a first loop changeover switch 30, which is a three-pole knife switch type and includes three groups of first loop polar phase contact points 31; one side of the three groups of first loop polar phase contact points 31 is corresponding to the current output unit 21 of the built-in voltage controller 20 through the three phase lines 22 for electrical connection; the other side of the three groups of first loop polar phase contact points 31 is electrically connected to the current output unit 21 of the built-in voltage controller 20 through the three extended first loop lines 32; a second loop changeover switch 40, which is a three-pole knife switch type and is in a spaced arrangement relationship with the first loop changeover switch 30; the second loop changeover switch 40 includes three groups of second loop polar phase contact points 41; one side of the three groups of second loop polar phase contact points 41 is electrically connected with the three phase lines 22; the other side of the three groups of second loop polar phase contact points 41 is corresponding to the three loop lines 32 through the three extended second loop lines 42 for electrical connection; a three-phase short-circuit changeover switch 50, which is a three-pole knife switch type and is in a spaced arrangement relationship with the second loop changeover switch 40; the three-phase short-circuit changeover switch 50 includes three groups of short-circuit polar phase contact points 51; one side of the three groups of short-circuit polar phase contact points 51 is electrically connected to each other through a short-circuit wire 52; the other side of the three groups of short-circuit polar phase contact points 51 is correspondingly to the ends of the three phase lines 22 for electrical connection; three converted-voltage output lines 60, with one end electrically connected to the second loop polar phase contact points 41 of the second loop changeover switch 40, is connected to one side of the second loop lines 42; the other end of the three converted-voltage output lines 60 is used to connect to a power device (not shown).

Figure 1:
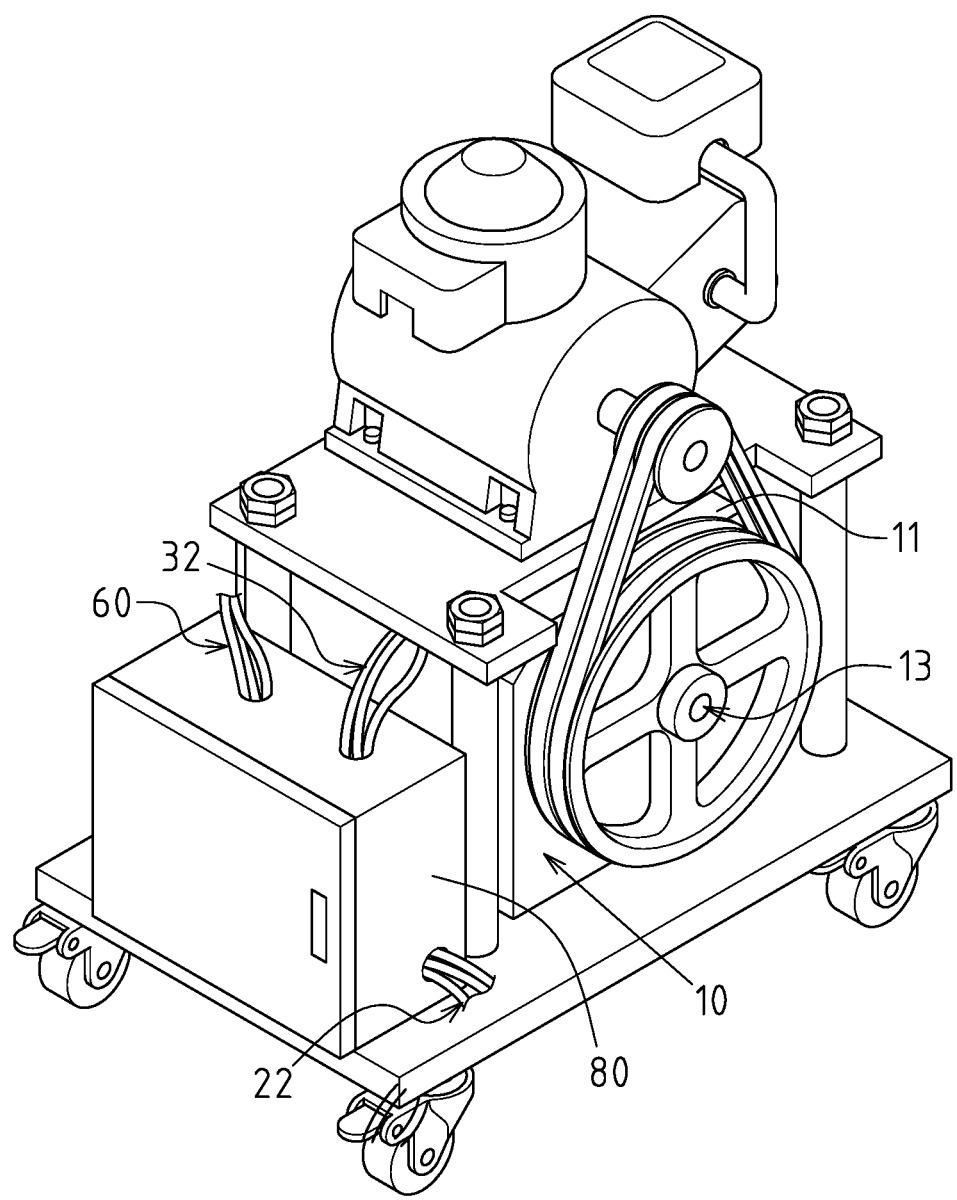
FIG. 1 is a three-dimensional view of a preferred embodiment of a generator of the present invention.
Figure 2:
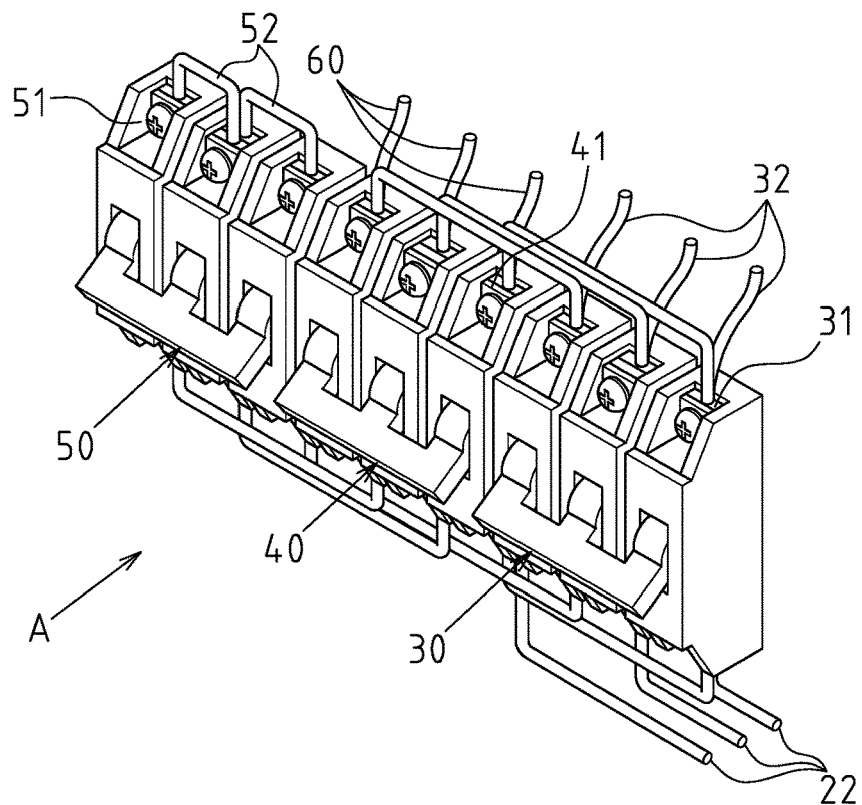
FIG. 2 is a three-dimensional view of a preferred embodiment of the changeover switch structure of the present invention.

As shown in FIGS. 1 and 2, in this embodiment, the generator A further comprises a case 80 for the accommodation of first loop changeover switch 30, second loop changeover switch 40, and three-phase short-circuit changeover switch 50.

Figure 5:
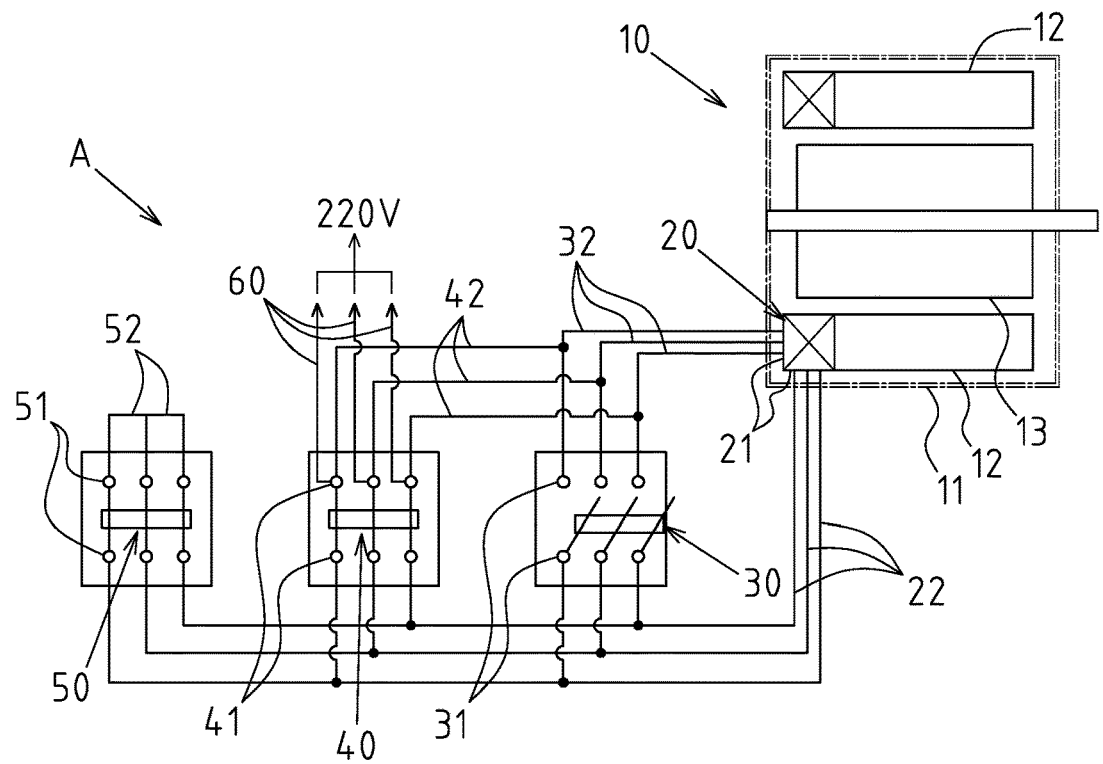
FIG. 5 is a schematic diagram of a second voltage output state of the voltage conversion structure of the present invention.

With the above structural configuration and technical features, in the actual application of the generator A disclosed in the present disclosure, the current generated by its operation can select different output voltages of 110V or 220V. This portion is first shown in FIG. 4. When we want to select the output voltage of 110V, the first loop changeover switch 30 and the second loop changeover switch 40 are switched to ON electrical conduction mode, and the three-phase short-circuit changeover switch 50 is switched to OFF electrical disconnection mode. In this loop mode, respective corresponding conduction state will be formed between the three phase lines 22 and the three first loop lines 32 to produce a step-down startup effect. In addition, the voltage control adjustment mechanism of the built-in voltage controller 20 can output a voltage of 110V through the three converted-voltage output lines 60. Then, as shown in FIG. 5, when we want to select the output voltage of 220V, the three-phase short-circuit changeover switch 50 and the second loop changeover switch 40 are switched to the ON electrical conduction mode, and the first loop changeover switch 30 is switch to OFF electrical disconnection mode. In this loop mode, since the three-phase short-circuit changeover switch 50 is in a short-circuit state and the three phase lines 22 and the three first loop lines 32 are in a non-conducting state, a step-down startup action is not generated. In addition, the voltage control adjustment mechanism of the built-in voltage controller 20 can output a voltage of 220V through the three converted-voltage output lines 60. It is worth mentioning that the built-in voltage controller 20 disclosed in the present invention is disposed inside the housing 11 of the motor 10 and is electrically connected with the stator 12, which is different from the practice that the commercially available transformer is connected outside the generator motor. The built-in voltage controller 20 disclosed by the present invention greatly simplifies the voltage transformation structure of the generator, the cost can be reduced significantly, and the installation volume can be greatly reduced. With the mechanical loop switching mechanism of the three-pole knife switch, the cost of this switch product is low, and it has advantages of convenient switching and accurate and safe operation.

Figure 6:
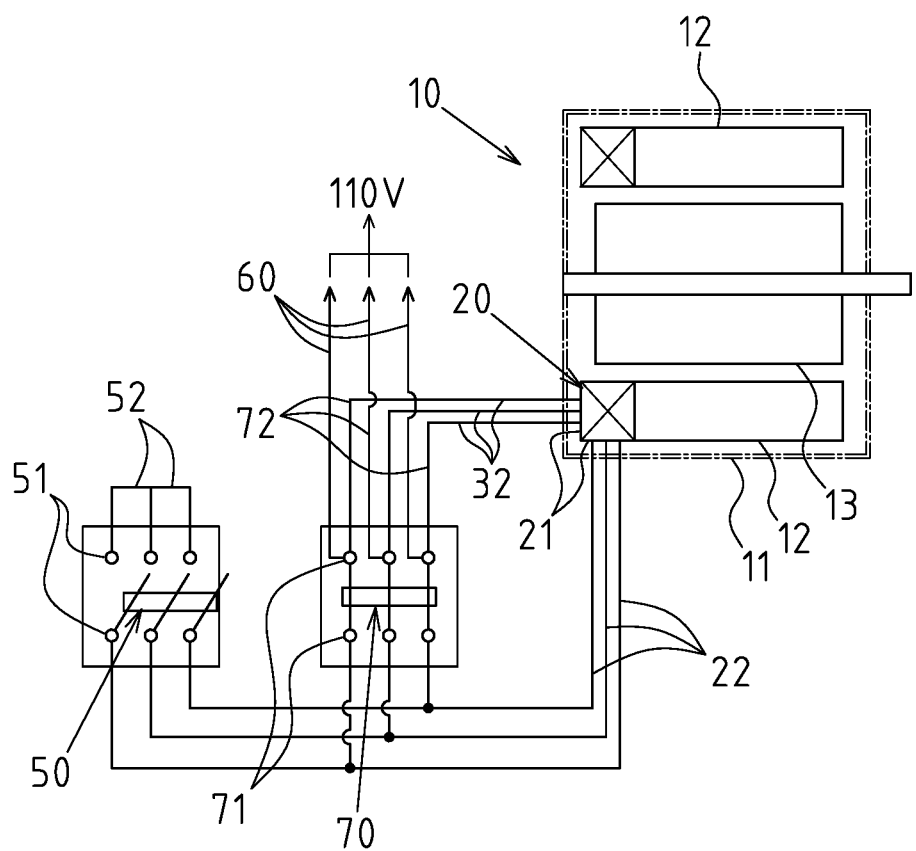
FIG. 6 shows another embodiment of the loop changeover switch configuration of the present invention.

As shown in FIG. 6, another preferred embodiment of loop changeover switch configuration is shown. The main difference between this embodiment and the previous embodiment is that only a single loop changeover switch 70 is provided, which is a three-pole knife switch type and includes three groups of loop polar phase contact points 71; one side of the three groups of loop polar phase contact points 71 is corresponding to and electrically connected to the three phase lines 22, and the other side of the three groups of loop polar phase contact points 71 is electrically connected to the current output unit 21 of the built-in voltage controller 20 through the three extended loop lines 72; a three-phase short-circuit changeover switch 50 is a three-pole knife switch type and is in a spaced arrangement relationship with the loop changeover switch 70; the three-phase short-circuit changeover switch 50 includes three groups of short-circuit polar phase contact points 51; one side of the three groups of short-circuit polar phase contact points 51 is electrically connected to each other through the short-circuit wire 52, and the other side of the three groups of short-circuit polar phase contact points 51 is corresponding to and electrically connected to three phase lines 22; three converted-voltage output lines 60, with one end electrically connected to the loop polar phase contact points 71 of the loop changeover switch 70, is connected to one side of the loop lines 72; the other end of the three converted-voltage output lines 60 is used to connect to a power device (not shown).

Figure 3:
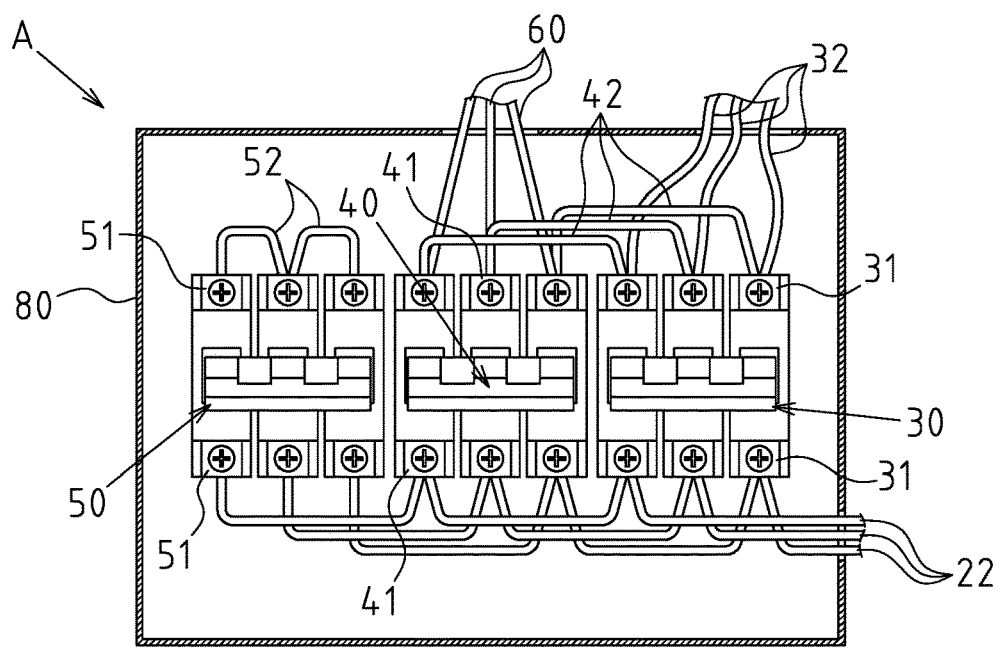
FIG. 3 is a front view of a preferred embodiment of the changeover switch structure of the present invention.

It can be understood from the above embodiments that the loop changeover switch used in the present invention may be a single group configuration type (as shown in FIG. 6) or two-group configuration type (as shown in FIGS. 2 to 4). It can be configured according to the needs of the client.

DESCRIPTION OF EFFICACY

The "generator with a built-in voltage controller" disclosed by the present invention is an innovative unique structure and technical feature, which is mainly composed of a voltage up-down controller, at least one loop changeover switch, three-phase short-circuit changeover switch, and converted-voltage output lines. In comparison with the conventional structure proposed by the prior art, the present invention can provide a new type of generator with a built-in voltage controller, which is matched with a mechanical loop switching mechanism of the three-pole knife switch to construct a voltage control switching mode of a generator. Compared with the conventional method of connecting a commercial transformer externally to the generator motor, the overall technical features of the present invention can greatly simplify the voltage transformation structure of the generator, reduce the cost, greatly reduce the installation volume, and improve the switching operation convenience and action accuracy and safety, which has practical advancement and better industrial economic benefits.

We claim:

1. A generator comprising:
a motor having a housing and a stator and a rotor, the stator and the rotor being received in the housing;
a voltage controller disposed inside the housing of said motor and in electrical connection with the stator, said voltage controller having a voltage up-down adjustment control function and a current output unit;
a first loop changeover switch having three groups of first loop phase contact points, one side of the first loop phase contact points connected to the current output unit of said voltage controller through a three phase line, another side of the first loop phase contact points being electrically connected to the current output unit of the voltage controller through three extended first loop lines, said first loop changeover switch being a three-pole knife switch;
a second loop changeover switch in spaced relationship to said first loop changeover switch, said second loop changeover switch having three groups of second loop phase contact points, one side of the three groups of second loop changeover switch being electrically connected to the three phase lines, another side of the three groups of second loop phase contact points electrically connected to three loop lines through the three extended loop lines, said second loop changeover switch being another three-pole knife switch;
a three-phase short-circuit changeover switch in spaced relation to said second loop changeover switch, said three-phase short-circuit changeover switch having three groups of short-circuit polar phase contact points, one side of the three groups of short-circuit polar phase contact points electrically connected to each other through a short-circuit wire, another side of the three groups of short-circuit polar phase contact points electrically connected to ends of the three phase lines, said three-phase short-circuit changeover switch being an additional three-pole knife switch; and
three converted-voltage output lines having one, end connected to the second loop phase contact points of said second loop changeover switch and connected to one side of the three extended loop lines, another end of the three converted-voltage output lines being adapted to connect to a power device.

2. The generator of claim 1, further comprising:
a case that accommodates said first loop changeover switch and said second loop changeover switch and said three-phase short-circuit changeover switch.

3. A generator comprising:
a motor having a housing and a stator and a rotor, the stator and the rotor being accommodated in the housing, a voltage controller disposed inside the housing of said motor and in electrical connection with the stator, said voltage controller having a voltage up-down adjustment control function and a current output unit;
a voltage controller disposed inside the housing of said motor and in electrical connection with the stator, said voltage controller having a voltage up-down adjustment control function and a current output unit;
a loop changeover switch having three groups of loop polar phase contact points, one side of the three groups of loop polar phase contact points electrically connected to the current output unit of said voltage controller through three phase lines, another side of the three groups of loop polar phase contact points electrically connected to the current output unit of said voltage controller through three extended loop lines, said loop changeover switch being a three-pole knife switch;
a three-phase short circuit changeover switch in spaced relation to said loop changeover switch, said three-phase short-circuit changeover switch having three groups of short-circuit polar phase contact points, one side of the three groups of short-circuit polar phase contact points electrically connected to each other through a short-circuit wire, another side of the three groups of short-circuit polar phase contact points electrically connected to the three phase lines, said three-phase short circuit changeover switch being another three-pole knife switch; and
three converted-voltage output lines having one end electrically connected to the loop polar phase contact points of said loop changeover switch, another end of said three converted-voltage output lines adapted to be connected to a power device.

4. The generator of claim 3, further comprising:
a case that accommodates said loop changeover switch and said three-phase short-circuit changeover switch.

* * * * *